US008558821B2

(12) United States Patent
Yu et al.

(10) Patent No.: US 8,558,821 B2
(45) Date of Patent: Oct. 15, 2013

(54) POWER DEVICE CAPABLE OF IMPROVING FLICKER OF A LIQUID CRYSTAL DISPLAY, LIQUID CRYSTAL DISPLAY CAPABLE OF IMPROVING FLICKER, AND METHOD CAPABLE OF IMPROVING FLICKER OF A LIQUID CRYSTAL DISPLAY

(75) Inventors: Chih-Chun Yu, Taoyuan County (TW); Chia-Yi Lu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 156 days.

(21) Appl. No.: 13/214,266

(22) Filed: Aug. 22, 2011

(65) Prior Publication Data

US 2013/0009937 A1 Jan. 10, 2013

(30) Foreign Application Priority Data

Jul. 5, 2011 (TW) ............................. 100123631 A

(51) Int. Cl.
*G06F 3/038* (2013.01)
*G09G 5/00* (2006.01)

(52) U.S. Cl.
USPC .......................................................... 345/204

(58) Field of Classification Search
USPC .................................................. 345/204–215
See application file for complete search history.

(56) References Cited

U.S. PATENT DOCUMENTS

2002/0195955 A1* 12/2002 Kudo et al. ................ 315/169.1
2006/0267685 A1* 11/2006 Alenin et al. ................. 330/258
2007/0171168 A1* 7/2007 Park et al. ....................... 345/92
2009/0289928 A1* 11/2009 Shi ................................ 345/209

FOREIGN PATENT DOCUMENTS

TW 588183 5/2004

* cited by examiner

*Primary Examiner* — Bipin Shalwala
*Assistant Examiner* — Hang Lin
(74) *Attorney, Agent, or Firm* — Winston Hsu; Scott Margo

(57) ABSTRACT

A power device capable of improving a flicker of a liquid crystal display includes a direct current (DC) voltage/direct current (DC) voltage converter, a common voltage circuit, and a clamper. The DC voltage/DC voltage converter is used for generating a DC low gate voltage. The common voltage circuit receives a polarity reversion signal generated by a timing control circuit, and generates an alternating current (AC) common voltage according to the polarity reversion signal. The clamper is coupled to the DC voltage/DC voltage converter and the common voltage circuit for receiving the DC low gate voltage and the AC common voltage, outputting the AC common voltage and outputting an AC low gate voltage according to the DC low gate voltage and the AC common voltage. A display panel improves the flicker according to the AC low gate voltage.

3 Claims, 8 Drawing Sheets

POWER DEVICE CAPABLE OF IMPROVING FLICKER OF A LIQUID CRYSTAL DISPLAY, LIQUID CRYSTAL DISPLAY CAPABLE OF IMPROVING FLICKER, AND METHOD CAPABLE OF IMPROVING FLICKER OF A LIQUID CRYSTAL DISPLAY

BACKGROUND OF THE INVENTION

1. Field of the Invention

The present invention is related to a power device capable of improving flicker of a liquid crystal display, a liquid crystal display capable of improving flicker, and method thereof, and particularly to a power device capable of improving flicker of a liquid crystal display, a liquid crystal display capable of improving flicker, and method thereof that utilize an alternating current low gate voltage to improve flicker caused by an alternating current common voltage.

2. Description of the Prior Art

Please refer to FIG. 1. FIG. 1 is a diagram illustrating a plurality of pixels included by a thin film transistor liquid crystal display (TFT-LCD) according to the prior art. As shown in FIG. 1, each pixel includes a thin film transistor 102, a liquid crystal capacitor CLC, and a storage capacitor CS, where a gate G of the thin film transistor 102 is coupled to a gate line G1, a source S of the thin film transistor 102 is coupled to a data line D1, and a drain D of the thin film transistor 102 is coupled to a liquid crystal capacitor CLC and a storage capacitor CS. In addition, another terminal of the liquid crystal capacitor CLC and another terminal of the storage capacitor CS are coupled to a common electrode COM.

Please refer to FIG. 2 and FIG. 3. FIG. 2 is a diagram illustrating a pixel 200 of the thin film transistor liquid crystal display, and FIG. 3 is a diagram illustrating relationships of a voltage stored in a storage capacitor CS and a liquid crystal capacitor CLC, a data voltage VDATA of the data line D1, a common voltage VCOM, a high gate voltage VGH and a low gate voltage VGL of the gate line G1. As shown in FIG. 2, the pixel 200 includes a thin film transistor 202, a liquid crystal capacitor CLC, and a storage capacitor CS, where a parasitic capacitor Cgd exists between a gate G and a drain D of the thin film transistor 202. As shown in FIG. 3, when the thin film transistor liquid crystal display displays an Nth frame, the thin film transistor 202 is turned on according to the high gate voltage VGH of the gate line G1, so the data voltage VDATA of the data line D1 charges the liquid crystal capacitor CLC and the storage capacitor CS. Meanwhile, a voltage of the drain D of the thin film transistor 202 is gradually increased to a voltage VP1. When the thin film transistor 202 is turned off according to the low gate voltage VGL of the gate line G1, the voltage of the drain D of the thin film transistor 202 instantly reduces a feedthrough voltage ΔVP due to a capacitive effect of the parasitic capacitor Cgd. That is to say, the voltage the drain D of the thin film transistor 202 is decreased to a voltage VP2. Similarly, when the thin film transistor liquid crystal display displays an (N+1)th frame, the voltage of the drain D of the thin film transistor 202 also reduces the feedthrough voltage ΔVP. Thus, the thin film transistor liquid crystal display has flicker because a positive feedthrough voltage ΔVPP is unequal to a negative feedthrough voltage ΔVPN. In addition, the feedthrough voltage ΔVP is determined by conservation of charge and equation (1):

$$\Delta VP = \frac{Cgd}{Cgd + CLC + CS}\Delta VG \quad (1)$$

As shown in equation (1), ΔVP=VP1−VP2, and AVG=VGH−VGL.

As shown in FIG. 3 and equation (1), when the common voltage VCOM provided by the common electrode COM is a direct current voltage, a thin film transistor liquid crystal display designer can compensate the flicker of the thin film transistor liquid crystal display caused by the feedthrough Voltage ΔVP by adjusting a direct current level of the common voltage VCOM. Meanwhile, the common voltage VCOM is determined by equation (2):

$$\Delta VCOM = \frac{\Delta VDATA}{2} - \Delta VP \quad (2)$$

As shown in FIG. 3, ΔVDATA is a difference between a high voltage and a low voltage of the data line D1. Please refer to FIG. 4. FIG. 4 is a diagram illustrating relationships of a voltage stored in the liquid crystal capacitor CLC and the storage capacitor CS, the data voltage VDATA of the data line D1, an alternating current common voltage VCOMAC (a high common voltage level VCOMH and a low common voltage level VCOML), and the high gate voltage VGH and the low gate voltage VGL of the gate line G1. In small and medium-sized thin film transistor liquid crystal display applications, the alternating current common voltage VCOMAC (the high common voltage level VCOMH and the low common voltage level VCOML) is usually used in the small and medium-sized thin film transistor liquid crystal displays due to low power and low cost requirements. As shown in FIG. 4, when the thin film transistor 202 is turned off and the alternating current common voltage VCOMAC is the low common voltage level VCOML, a low feedthrough voltage level ΔVPL is determined by equation (3):

$$\Delta VPL = \frac{Cgd}{Cgd + CLC + CS}\Delta VG \quad (3)$$

When the thin film transistor 202 is turned off and the alternating current common voltage VCOMAC is the high common voltage level VCOMH, a high feedthrough voltage level ΔVPH is determined by equation (4):

$$\Delta VPH = \frac{CLC + CS}{Cgd + CLC + CS}\Delta VCOM \quad (4)$$

In equation (4), ΔVCOM=VCOMH−VCOML. As shown in equation (3) and equation (4), because the high feedthrough voltage level ΔVPH is unequal to ΔVCOM, a voltage V1 is unequal to a voltage V2. Therefore, the thin film transistor liquid crystal display designer can not compensate the flicker of the thin film transistor liquid crystal display due to ΔVCOM being unequal to the high feedthrough voltage level ΔVPH by merely adjusting a voltage level of the alternating current common voltage VCOMAC.

SUMMARY OF THE INVENTION

An embodiment provides a power device capable of improving a flicker of a liquid crystal display. The power device includes a direct current voltage/direct current voltage converter, a common voltage circuit, and a clamper. The direct current voltage/direct current voltage converter is used for generating a direct current low gate voltage. The common voltage circuit is used for receiving a polarity reversion signal generated by a timing control circuit, and generating an alternating current common voltage according to the polarity reversion signal. The clamper is coupled to the direct current voltage/direct current voltage converter and the common voltage circuit for receiving the direct current low gate voltage and the alternating current common voltage, outputting the alternating current common voltage, and outputting an alternating current low gate voltage according to the direct current low gate voltage and the alternating current common voltage. The alternating current low gate voltage is synchronized with the alternating current common voltage.

Another embodiment provides a liquid crystal display capable of improving flicker. The liquid crystal display includes a system module and a liquid crystal display module. The system module includes a timing control circuit and a power device. The timing control circuit is used for receiving an image signal, and generating a data voltage, a control signal, and a polarity reversion signal corresponding to the image signal according to the image signal. The power device is coupled to the timing control circuit. The power device includes a direct current voltage/direct current voltage converter, a common voltage circuit, and a clamper. The direct current voltage/direct current voltage converter is used for generating a direct current low gate voltage. The common voltage circuit is used for receiving the polarity reversion signal, and generating an alternating current common voltage according to the polarity reversion signal. The clamper is coupled to the direct current voltage/direct current voltage converter and the common voltage circuit for receiving the direct current low gate voltage and the alternating current common voltage outputting the alternating current common voltage, and outputting an alternating current low gate voltage according to the direct current low gate voltage and the alternating current common voltage. The alternating current low gate voltage is synchronized with the alternating current common voltage. The liquid crystal display module includes at least one source driver, at least one gate driver, and a display panel, where the display panel includes a plurality of pixels. The at least one source driver and the at least one gate driver turn on and turn off the plurality of pixels and charge the plurality of pixels according to the data voltage, the control signal, and the alternating current common voltage corresponding to the image signal. The display panel improves flicker of the display panel according to the alternating current low gate voltage, and the display panel displays an image which represents the image signal according to voltages of the plurality of pixels.

Another embodiment provides a method capable of improving flicker of a liquid crystal display. The method includes receiving an image signal; generating a data voltage, a control signal, and a polarity reversion signal corresponding to the image signal according to the image signal; generating a direct current low gate voltage; generating an alternating current common voltage according to the polarity reversion signal; receiving the direct current low gate voltage and the alternating current common voltage, outputting the alternating current common voltage, and outputting an alternating current low gate voltage according to the direct current low gate voltage and the alternating current common voltage; turning on and turning off the plurality of pixels and charging the plurality of pixels according to the data voltage, the control signal, and the alternating current common voltage; improving flicker of a display panel according to the alternating current low gate voltage; displaying an image which represents the image signal according to voltages of the plurality of pixels.

The present invention provides a power device capable of improving flicker of a liquid crystal display, a liquid crystal display capable of improving flicker, and method thereof. The power device, the liquid crystal display, and the method utilize a direct current voltage/direct current voltage converter and a common voltage circuit of the power device to generate an alternating current low gate voltage through a clamper. Thus, the present invention can compensate the flicker resulting from an alternating current common voltage through the alternating current low gate voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
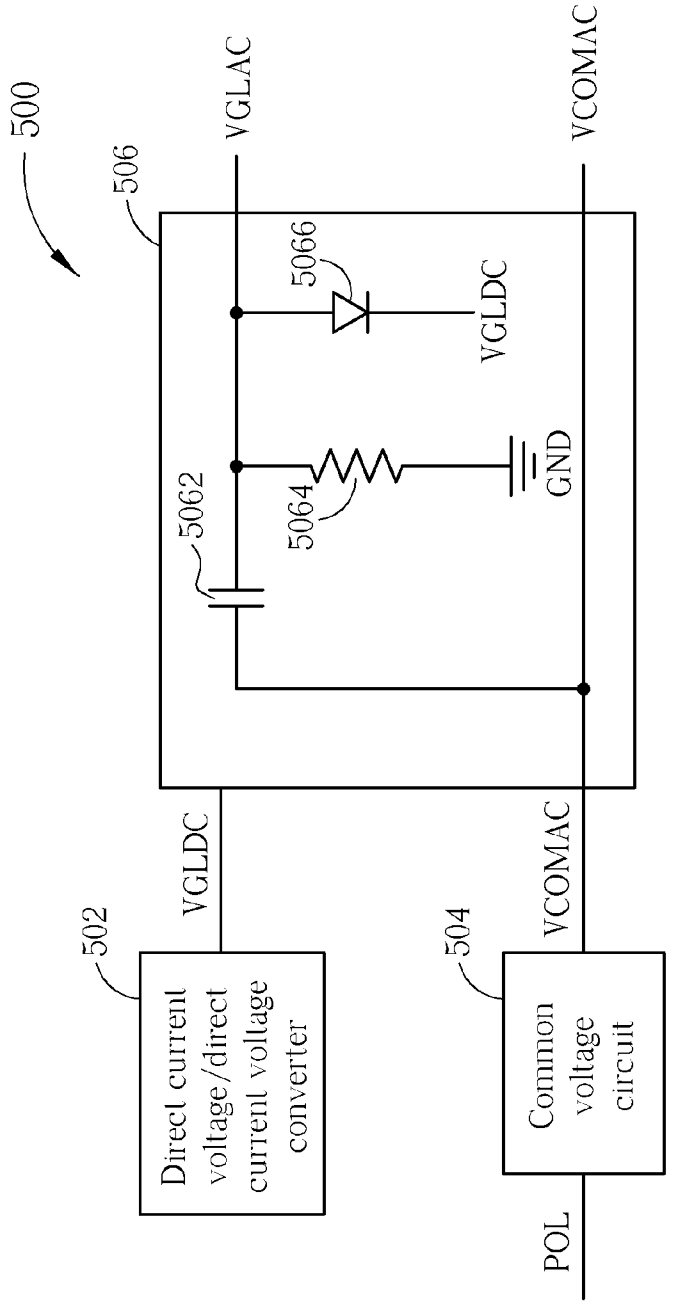
FIG. 5 is a diagram illustrating a power device capable of improving flicker of a liquid crystal display according to an embodiment.

Please refer to FIG. 5. FIG. 5 is a diagram illustrating a power device 500 capable of improving flicker of a liquid crystal display according to an embodiment. The power device 500 includes a direct current voltage/direct current voltage converter 502, a common voltage circuit 504, and a clamper 506. The direct current voltage/direct current voltage converter 502 is used for generating a direct current low gate voltage VGLDC. The common voltage circuit 504 is used for receiving a polarity reversion signal POL generated by a timing control circuit, and generating an alternating current common voltage VCOMAC according to the polarity reversion signal polarity reversion signal POL. The clamper 506 is coupled to the direct current voltage/direct current voltage converter 502 and the common voltage circuit 504 for receiving the direct current low gate voltage VGLDC and the alternating current common voltage VCOMAC, outputting the alternating current common voltage VCOMAC, and outputting an alternating current low gate voltage VGLAC according to the direct current low gate voltage VGLDC and the alternating current common voltage VCOMAC. In addition, the alternating current low gate voltage VGLAC is synchronized with the alternating current common voltage VCOMAC.

As shown in FIG. 5, the clamper 506 includes a capacitor 5062, a resistor 5064, and a diode 5066, where the clamper 506 is a negative clamper. The capacitor 5062 has a first terminal coupled to the common voltage circuit 504 for receiving the alternating current common voltage VCOMAC and outputting the alternating current common voltage VCOMAC, and a second terminal for outputting the alternating current low gate voltage VGLAC. The resistor 5064 has a first terminal coupled to the second terminal of the capacitor 5062, and a second terminal coupled to ground GND. The diode 5066 has an anode coupled to the second terminal of the capacitor 5062, and a cathode coupled to the direct current voltage/direct current voltage converter 502 for receiving the direct current low gate voltage VGLDC. For example, if the direct current low gate voltage VGLDC is −6V and the alternating current common voltage VCOMAC is between 0V and 4V, the alternating current low gate voltage VGLAC outputted by the clamper 506 is between −2V and −6V. But, the present invention is not limited to the direct current low gate voltage VGLDC being −6V and the alternating current common voltage VCOMAC being between 0V and 4V.

Figure 6:
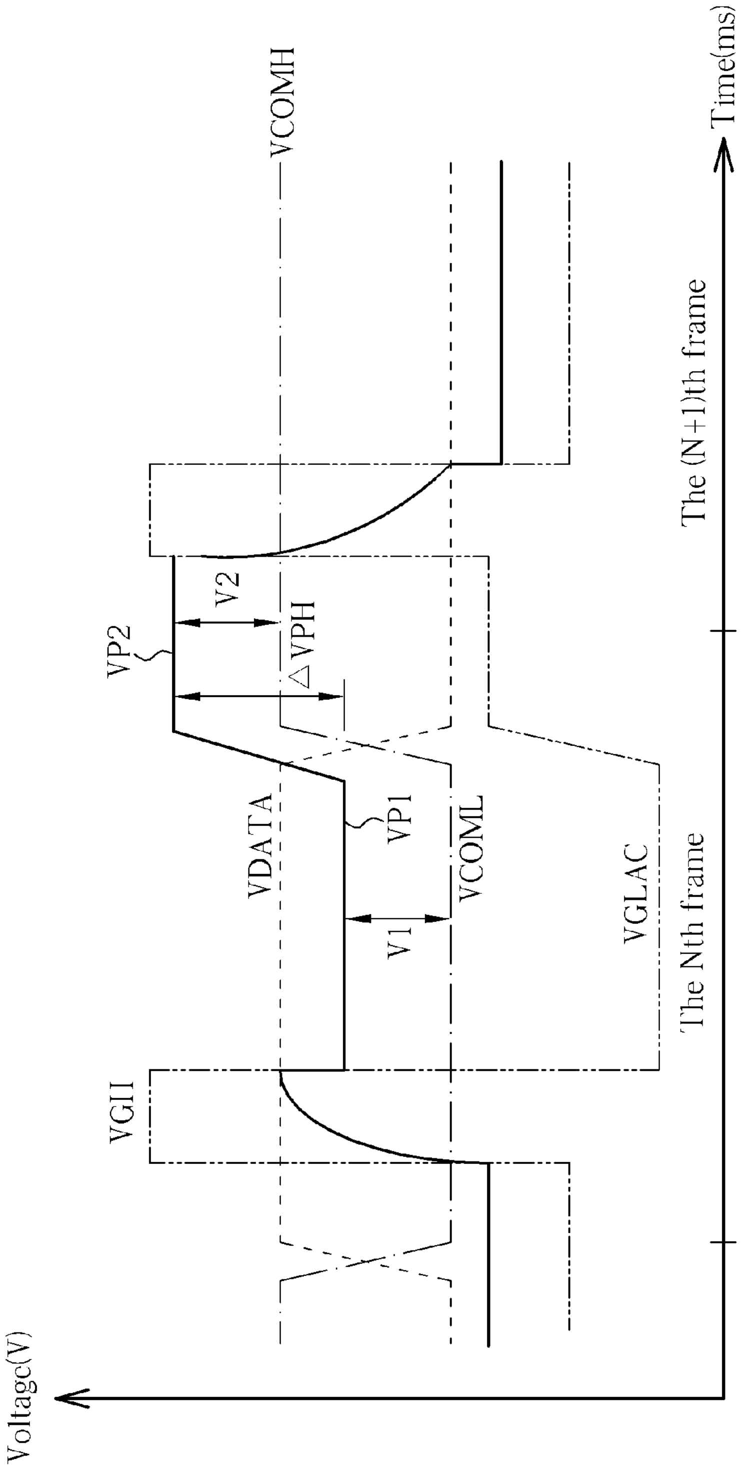
FIG. 6 is a diagram illustrating relationships of voltages stored in a storage capacitor and a liquid crystal capacitor, a data voltage of a data line, the alternating current common voltage, and a high gate voltage and the alternating current low gate voltage of a gate line according to an embodiment.

Please refer to FIG. 6. FIG. 6 is a diagram illustrating relationships of voltages VP1, VP2 stored in a storage capacitor CS and a liquid crystal capacitor CLC, a data voltage VDATA of a data line D1, the alternating current common voltage VCOMAC (a high common voltage level VCOMH and a low common voltage level VCOML), and a high gate voltage VGH and the alternating current low gate voltage level VGLAC of a gate line G1. As shown in FIG. 6, a voltage V1 and a voltage V2 are determined by equation (5) and equation (6), respectively:

$$V1 = VP1 - \text{VCOML} \tag{5}$$

$$V2 = VP2 - \text{VCOMH} \tag{6}$$

Figure 1:
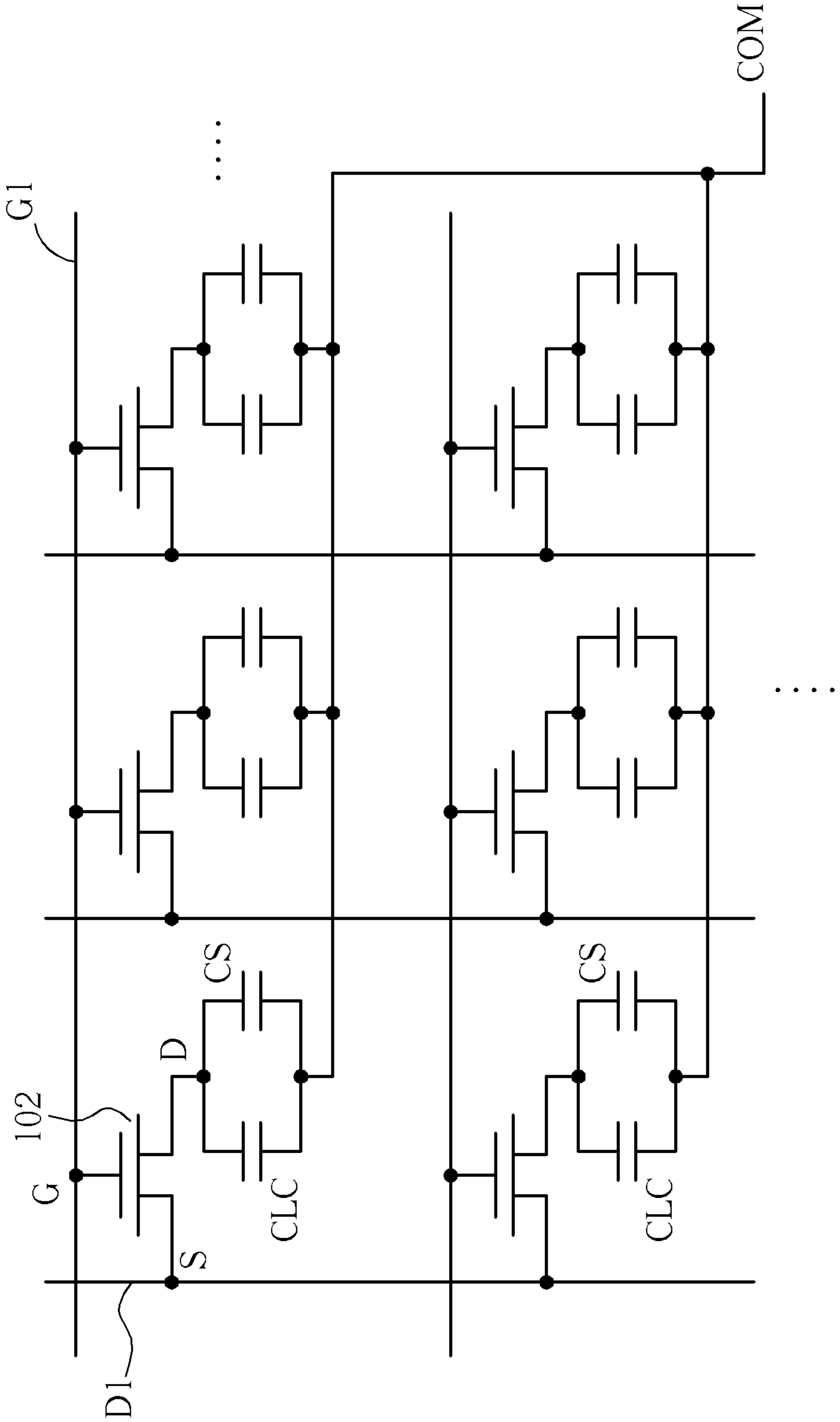
FIG. 1 PRIOR ART
FIG. 1 is a diagram illustrating a plurality of pixels included by a thin film transistor liquid crystal display according to the prior art.
Figure 2:
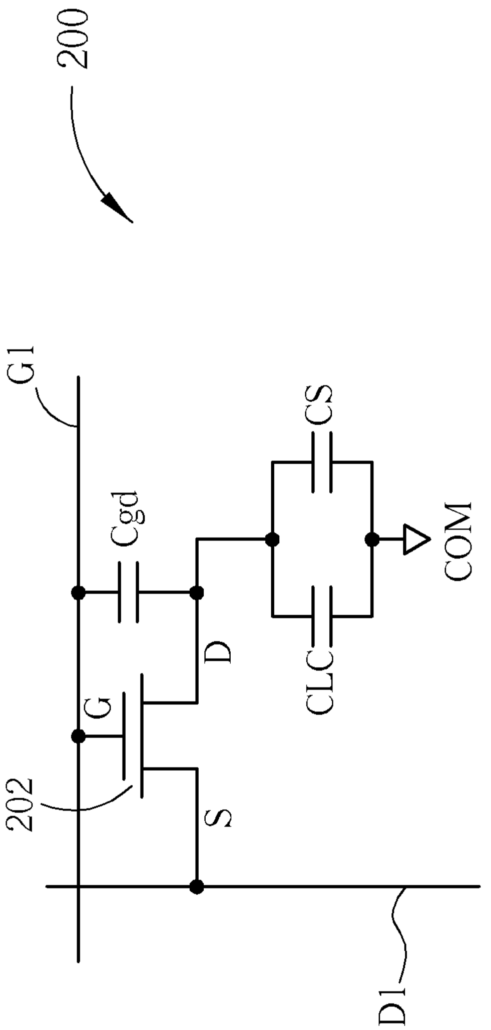
FIG. 2 PRIOR ART
FIG. 2 is a diagram illustrating a pixel of the thin film transistor liquid crystal display.
Figure 3:
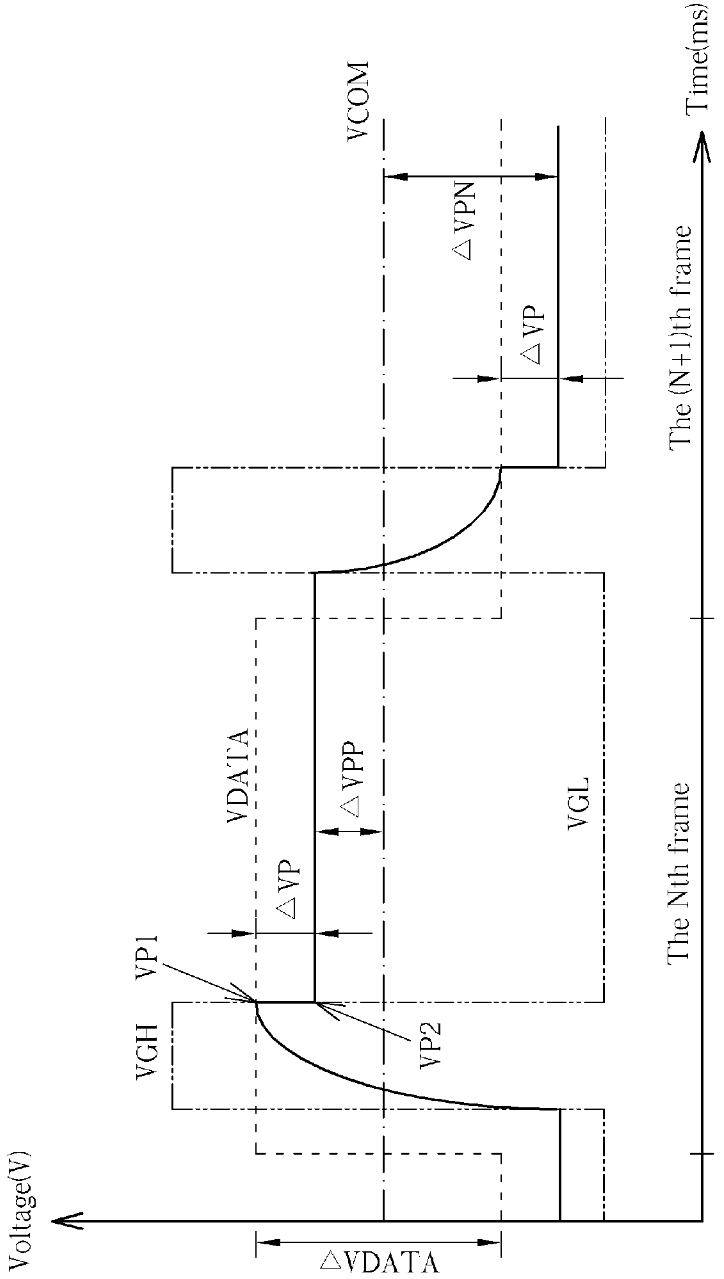
FIG. 3 PRIOR ART
FIG. 3 is a diagram illustrating relationships of a voltage stored in the storage capacitor and the liquid crystal capacitor, a data voltage of the data line, a common voltage, a high gate voltage and a low gate voltage of the gate line according to the prior art.
Figure 4:
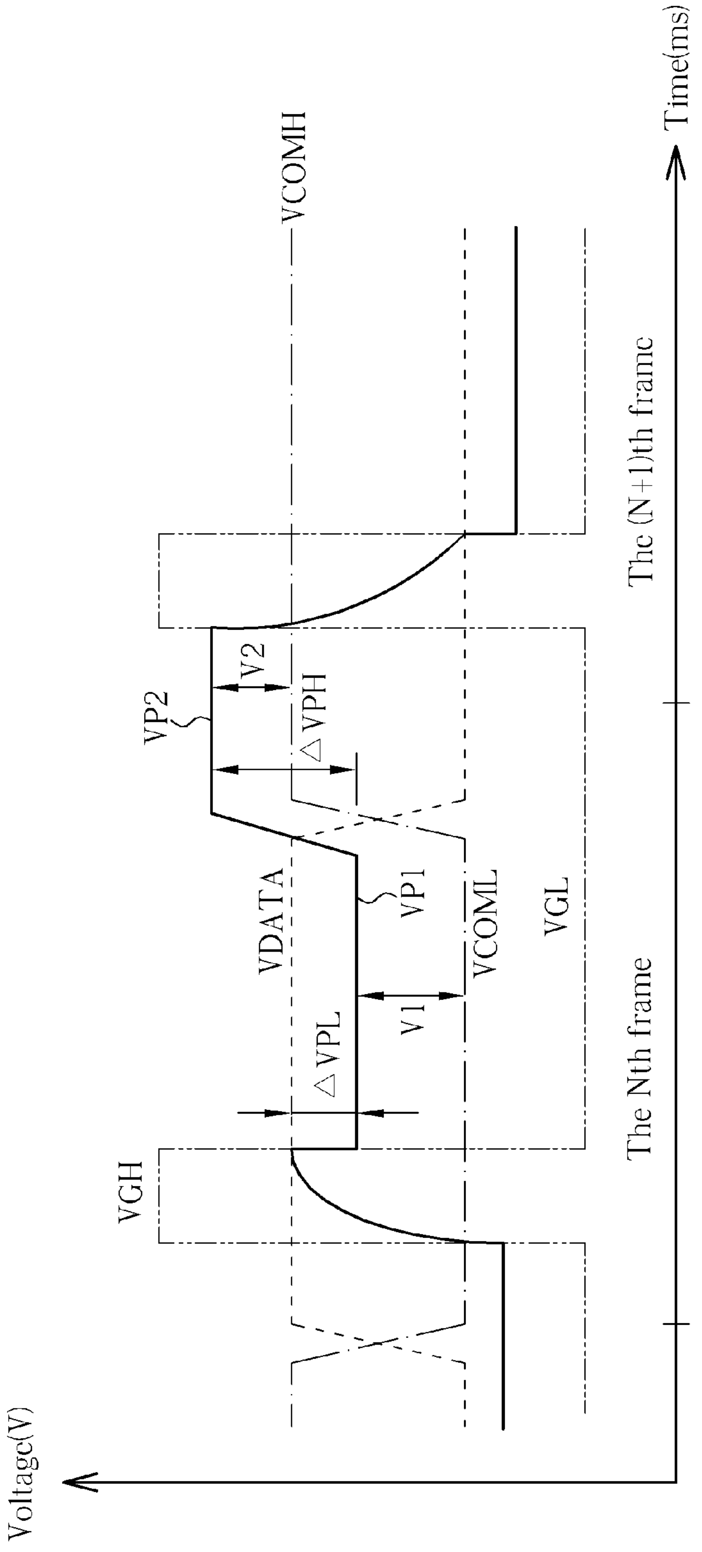
FIG. 4 PRIOR ART
FIG. 4 is a diagram illustrating relationships of voltages stored in the liquid crystal capacitor and the storage capacitor, the data voltage of the data line, an alternating current common voltage, and the high gate voltage and the low gate voltage of the gate line according to the prior art.

In addition, as shown in FIG. 4 and FIG. 6, when the gate line G1 has a low gate voltage VGL (a direct current voltage), a high feedthrough voltage level ΔVPH is determined by equation (4); when the gate line G1 has the alternating current low gate voltage VGLAC, a high feedthrough voltage level ΔVPH is determined by equation (7):

$$\begin{aligned} \Delta VPH &= VP2 - VP1 \qquad (7)\\ &= \frac{CLC + CS}{CLC + CS + Cgd} \times \Delta VCOM + \frac{Cgd}{CLC + CS + Cgd} \times \Delta VCOM \\ &= \Delta VCOM \\ &= \Delta VCOMH - VCOML \end{aligned}$$

As shown in FIG. 5, because the clamper 506 generates the alternating current low gate voltage VGLAC according to the alternating current common voltage VCOMAC and the direct current low gate voltage VGLDC, amplitude of the alternating current low gate voltage VGLAC is equal to ΔVCOM. Therefore, as shown in equation (7), $$\frac{Cgd}{CLC + CS + Cgd} \times \Delta VCOM$$

is contributed from the alternating current low gate voltage VGLAC. Then, equation (8) is derived from equation (7):

$$VP2 - VP1 = \text{VCOMH} - \text{VCOML} \tag{8}$$

As shown in FIG. 6, equation (9) is determined by equation (8):

$$VP2 - \text{VCOMH} = VP1 - \text{VCOML}$$

$$\Rightarrow V2 = V1 \tag{9}$$

As shown in equation (9), the voltage V1 is equal to the voltage V2, so the power device 500 can solve flicker generated by the alternating current common voltage VCOMAC.

Figure 7:
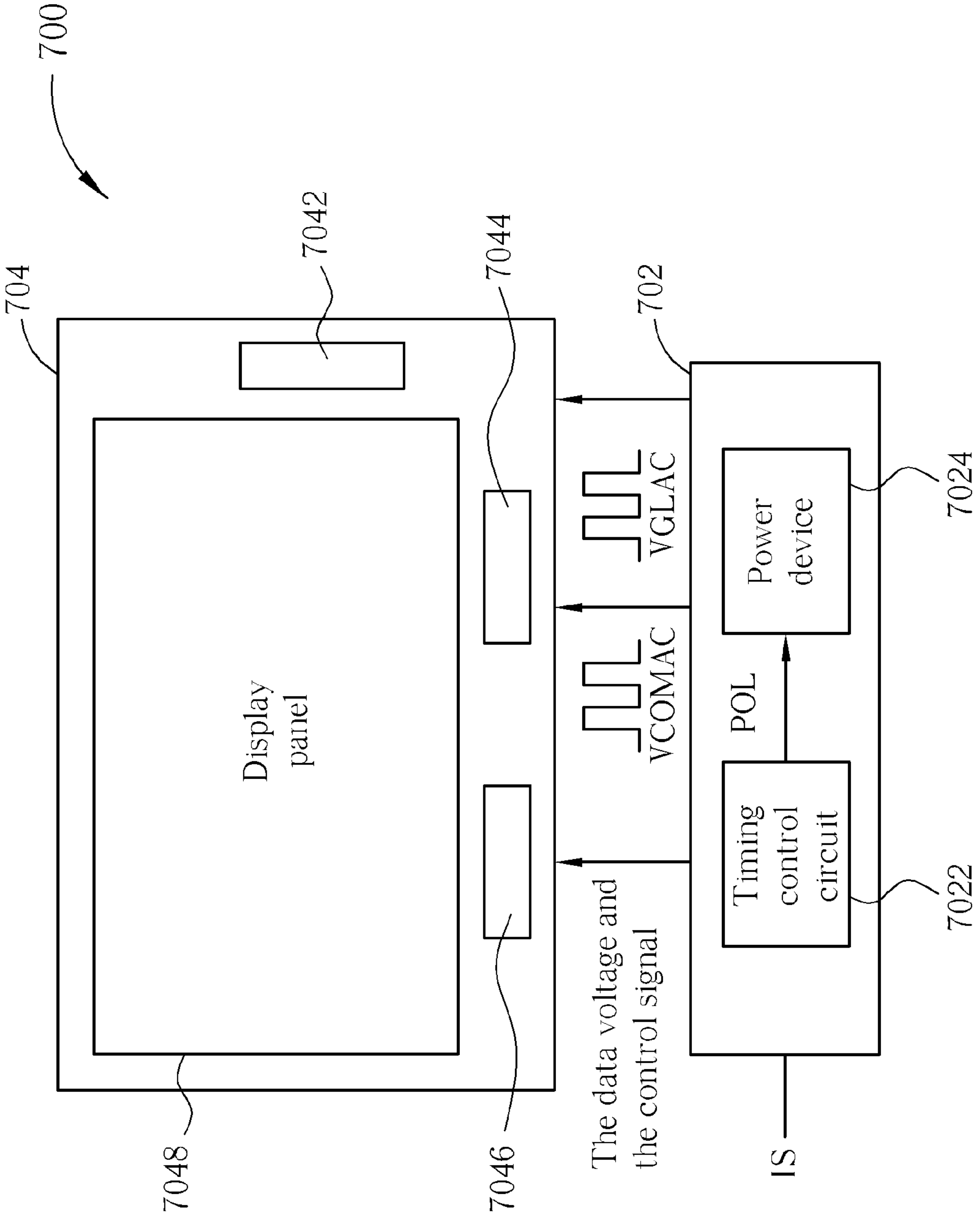
FIG. 7 is a diagram illustrating a liquid crystal display capable of improving flicker according to another embodiment.

Please refer to FIG. 5 and FIG. 7 simultaneously. FIG. 7 is a diagram illustrating a liquid crystal display 700 capable of improving flicker according to another embodiment. The liquid crystal display 700 includes a system module 702 and a liquid crystal display module 704. The system module 702 includes a timing control circuit 7022 and a power device 7024. The timing control circuit 7022 is used for receiving an image signal IS, and generating a data voltage, a control signal, and a polarity reversion signal POL corresponding to the image signal IS according to the image signal IS. The power device 7024 is coupled to the timing control circuit 7022. The power device 7024 includes a direct current voltage/direct current voltage converter 502, a common voltage circuit 504, and a clamper 506, and the clamper 506 includes a capacitor 5062, a resistor 5064, and a diode 5066, where the power device 7024 is the same as the power device 500, so further description thereof is omitted for simplicity. The liquid crystal display module 704 includes a gate driver 7042, two source drivers 7044, 7046, and a display panel 7048, where the display panel 7048 includes a plurality of pixels, and the plurality of pixels includes at least one thin film transistor. The source drivers 7044, 7046 and the gate driver 7042 turn on and turn off the plurality of pixels and charge the plurality of pixels according to the data voltage, the control signal, the alternating current common voltage VCOMAC, and the alternating current low gate voltage VGLAC corresponding to the image signal IS. As shown in FIG. 6 and equation (5) to equation (9), because the voltage V1 is equal to the voltage V2, the display panel 7048 can improve flicker of the display panel 7048 according to the alternating current low gate voltage VGLAC, and the display panel 7048 displays an image which represents the image signal according to voltages stored in the plurality of pixels.

Figure 8:
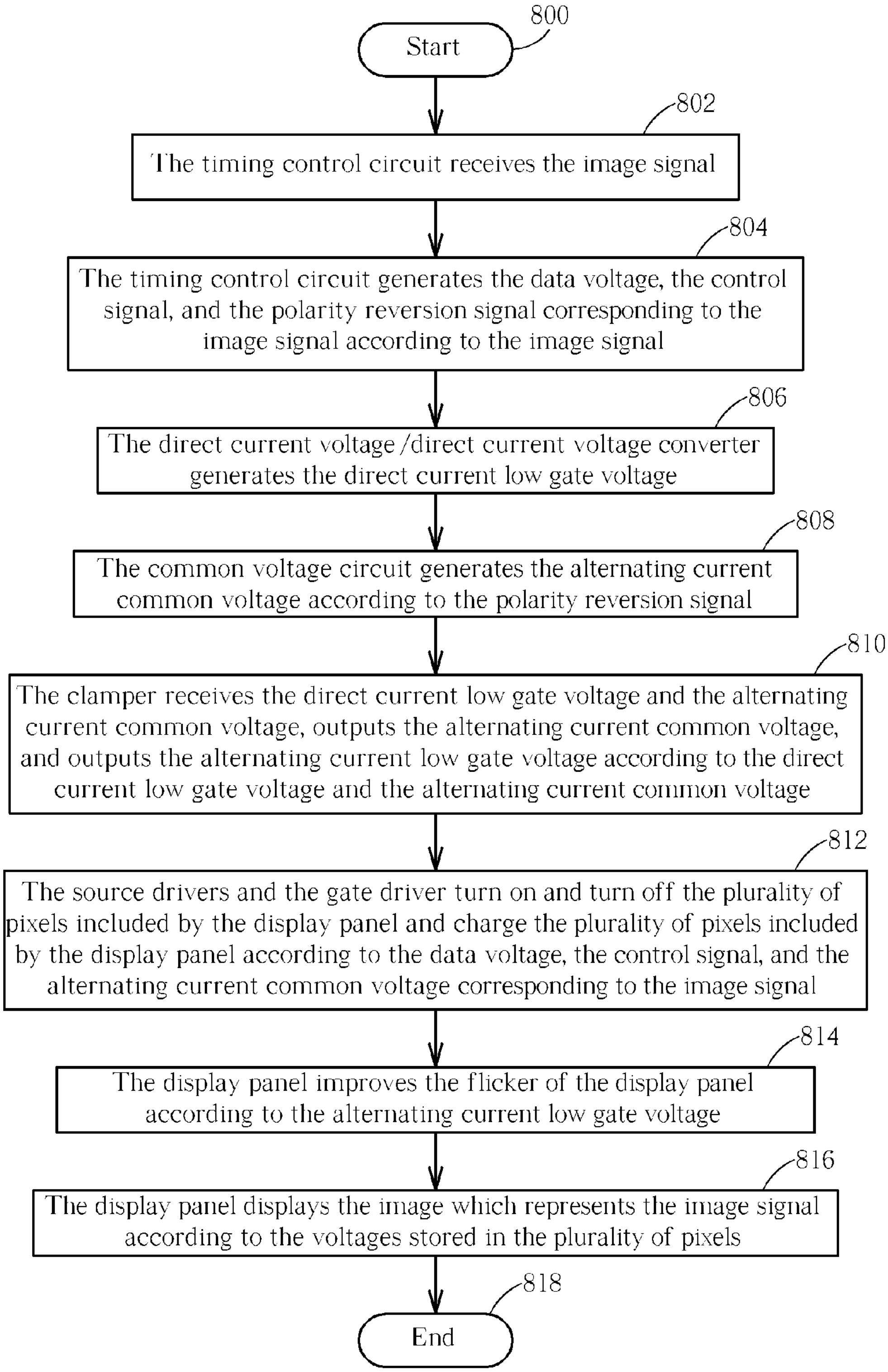
FIG. 8 is a flowchart illustrating a method capable of improving flicker of a liquid crystal display according to another embodiment.

Please refer to FIG. 8. FIG. 8 is a flowchart illustrating a method capable of improving flicker of a liquid crystal display according to another embodiment. The method in FIG. 8 is illustrated using the liquid crystal display 700 in FIG. 7. Detailed steps are as follows:

Step 800: Start.

Step 802: The timing control circuit 7022 receives the image signal IS.

Step 804: The timing control circuit 7022 generates the data voltage, the control signal, and the polarity reversion signal POL corresponding to the image signal IS according to the image signal IS.

Step 806: The direct current voltage/direct current voltage converter 502 generates the direct current low gate voltage VGLDC.

Step 808: The common voltage circuit 504 generates the alternating current common voltage VCOMAC according to the polarity reversion signal POL.

Step 810: The clamper 506 receives the direct current low gate voltage VGLDC and the alternating current common voltage VCOMAC, outputs the alternating current common voltage VCOMAC, and outputs the alternating current low gate voltage VGLAC according to the direct current low gate voltage VGLDC and the alternating current common voltage VCOMAC.

Step 812: The source drivers 7044, 7046 and the gate driver 7042 turn on and turn off the plurality of pixels included by the display panel 7048 and charge the plurality of pixels included by the display panel 7048 according to the data voltage, the control signal, and the alternating current common voltage VCOMAC corresponding to the image signal IS.

Step 814: The display panel 7048 improves the flicker of the display panel 7048 according to the alternating current low gate voltage VGLAC.

Step 816: The display panel 7048 displays the image which represents the image signal according to the voltages stored in the plurality of pixels.

Step 818: End.

In Step 810, the clamper 506 is the negative clamper, and the alternating current low gate voltage VGLAC is synchronized with the alternating current common voltage VCOMAC. In Step 814, as shown in FIG. 6 and equation (5) to equation (9), because the voltage V1 is equal to the voltage V2, the display panel 7048 can improve the flicker of the display panel 7048 according to the alternating current low gate voltage VGLAC.

To sum up, the power device capable of improving flicker of the liquid crystal display, the liquid crystal display capable of improving flicker, and method thereof utilize the direct current voltage/direct current voltage converter and the common voltage circuit of the power device to generate the alternating current low gate voltage through the clamper. Thus, the present invention can compensate the flicker resulting from the alternating current common voltage through the alternating current low gate voltage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power device capable of improving flicker of a liquid crystal display, the power device comprising:

a direct current voltage/direct current voltage converter for generating a direct current low gate voltage;

a common voltage circuit for receiving a polarity reversion signal generated by a timing control circuit, and generating an alternating current common voltage according to the polarity reversion signal; and a clamper coupled to the direct current voltage/direct current voltage converter and the common voltage circuit for receiving the direct current low gate voltage and the alternating current common voltage, outputting the alternating current common voltage, and outputting an alternating current low gate voltage according to the direct current low gate voltage and the alternating current common voltage, the clamper comprising:

a capacitor having a first terminal coupled to the common voltage circuit for receiving the alternating current common voltage, and outputting the alternating current common voltage, and a second terminal for outputting the alternating current low gate voltage;

a resistor having a first terminal coupled to the second terminal of the capacitor, and a second terminal coupled to ground; and a diode having an anode coupled to the second terminal of the capacitor, and a cathode coupled to the direct current voltage/direct current voltage converter for receiving the direct current low gate voltage, wherein the diode is conductive during a first low gate voltage period of the alternating current low gate voltage and is not conductive during a second low gate voltage period of the alternating current low gate voltage;

wherein the alternating current low gate voltage is synchronized with the alternating current common voltage.

2. A liquid crystal display capable of improving flicker, the liquid crystal display comprising:

a system module comprising:

timing control circuit for receiving an image signal, and generating a data voltage, a control signal, and a polarity reversion signal corresponding to the image signal according to the image signal; and a power device coupled to the timing control circuit, the power device comprising:

a direct current voltage/direct current voltage converter for generating a direct current low gate voltage;

a common voltage circuit for receiving the polarity reversion signal, and generating an alternating current common voltage according to the polarity reversion signal; and a clamper coupled to the direct current voltage/direct current voltage converter and the common voltage circuit for receiving the direct current low gate voltage and the alternating current common voltage, outputting the alternating current common voltage, and outputting an alternating current low gate voltage according to the direct current low gate voltage and the alternating current common voltage, the clamper comprising:

a capacitor having a first terminal coupled to the common voltage circuit for receiving the alternating current common voltage, and outputting the alternating current common voltage, and a second terminal for outputting the alternating current low gate voltage;

a resistor having a first terminal coupled to the second terminal of the capacitor, and a second terminal coupled to ground; and a diode having an anode coupled to the second terminal of the capacitor, and a cathode coupled to the direct current voltage/direct current voltage converter for receiving the direct current low gate voltage, wherein the diode is conductive during a first low gate voltage period of the alternating current low gate voltage and is not conductive during a second low gate voltage period of the alternating current low gate voltage;

wherein the alternating current low gate voltage is synchronized with the alternating current common voltage;

a liquid crystal display module comprising: at least one source driver;

at least one gate driver;

and a display panel comprising a plurality of pixels;

wherein the at least one source driver and the at least one gate driver turn on and turn off the plurality of pixels and charge the plurality of pixels according to the data voltage, the control signal, and the alternating current common voltage corresponding to the image signal; and the display panel improves flicker of the display panel according to the alternating current low gate voltage, and the display panel displays an image which represents the image signal according to voltages of the plurality of pixels.

3. The liquid crystal display of claim 2, wherein the plurality of pixels includes at least one thin film transistor.

* * * * *